United States Patent [19]
Weimer

[11] 3,956,574
[45] May 11, 1976

[54] BUSWAY INSULATION SYSTEM

[75] Inventor: Charles L. Weimer, Beaver Falls, Pa.

[73] Assignee: Westinghouse Electric Corporation, Pittsburgh, Pa.

[22] Filed: Feb. 22, 1974

[21] Appl. No.: 444,941

[52] U.S. Cl. ............................ 174/68 B; 174/99 B; 174/117 FF
[51] Int. Cl.² .......................................... H01B 7/02
[58] Field of Search ............... 174/68 B, 88 B, 99 B, 174/117 FF, 119, 133 B; 156/47, 52, 53, 54, 56

[56] References Cited
UNITED STATES PATENTS

| | | | |
|---|---|---|---|
| 3,202,756 | 8/1965 | Stanback | 174/117 FF X |
| 3,396,230 | 8/1968 | Crimmins | 174/117 FF X |
| 3,444,311 | 5/1969 | Weimer et al. | 174/68 B |
| 3,461,222 | 8/1969 | Jorgensen | 174/117 FF |
| 3,555,293 | 1/1971 | Shannon et al. | 174/68 B X |
| 3,584,137 | 6/1971 | Weimer | 174/68 B |
| 3,600,802 | 8/1971 | Jorgensen | 174/117 FF X |
| 3,614,297 | 10/1971 | Carlson | 174/117 FF X |
| 3,639,680 | 2/1972 | Dempsey | 174/68 B X |
| 3,726,988 | 4/1973 | Davis | 174/68 B |

*Primary Examiner*—Arthur T. Grimley
*Attorney, Agent, or Firm*—W. A. Elchik

[57] ABSTRACT

An elongated section of bus duct having U-shaped insulating pieces surrounding the longitudinally extending edges of the stacked bus bars and a flat insulating sheet of a material which does not adhere to the U-shaped insulating pieces disposed between the bus bars. The flat insulating sheets can also be disposed between the housing and the outside stacked bus bars which are compressed by the housing. The non self-adhering U-shaped pieces and the flat insulating sheets permit the insulated bus bars to slide with respect to each other due to differentials in expansion and contraction of the bus bars. The sliding action, of the U-shaped insulating pieces and the flat insulating sheet, prevents rupture of the primary insulation layer which is applied to the bus bars and which is self-adhering at operating temperatures and pressures.

9 Claims, 3 Drawing Figures

FIG. I.

BUSWAY INSULATION SYSTEM

BACKGROUND OF THE INVENTION

This invention relates to electric power distribution systems and more particularly to bus duct where a plurality of stacked insulated bus bars are supported in an elongated housing.

Normally, bus duct comprises a plurality of generally flat insulated bus bars supported in a housing that is drawn together to mount the insulated bus bars in a compact sandwiched relationship. The insulated bus bars are supported as a stack set. An elongated housing generally comprises a pair of oppositely disposed housing members that are drawn towards each other against the flat faces of the outer insulated bus bars of the stack set, to support the stacked set of insulated bus bars in a compact sandwiched relationship between the housing members. In accordance with prior art practice it has been found desirable to utilize a construction in which the insulated bus bars are maintained in a sandwiched relationship with the bus duct housing because of the very efficient heat dissipation which can occur and the low voltage drop present per unit length. However, with the commonly used insulating material it has been found that the insulated bus bars when sandwiched together under a slight pressure tend to stick together. If the insulated bus bars stick together when relative movement of the insulated bus bars occur, due to thermal expansion, the primary insulation surrounding the bus bars can be damaged causing the bus duct to fail under some operating conditions. Failure of the primary bus bar insulation can lead to the bus duct section being damaged or destroyed.

SUMMARY OF THE INVENTION

An improved bus duct having an elongated housing is provided. A plurality of generally flat bus bars having a primary insulation coating applied thereto, are stacked in a compact relationship with the wide surfaces adjacent to each other. The edges of the insulated bus bars are covered with a secondary non self-adhering U-shaped insulation. A flat sheet of non self-adhering insulation is disposed between each bus bar to slide the U-shaped insulation. The non self-adhering insulation permits the insulated bus bars to slide with respect to each other due to differentials in expansion and contraction of the bus bars. The sliding action prevents rupture of the primary insulation which would stick to itself at normal operating temperatures and under a slight pressure. The U-shaped insulation will adhere to the primary insulation coating on the bus bars. A flat sheet of non self-adhering insulation between the bus bars provides a sliding action as the flat sheet insulation slides on the U-shaped edge insulation.

The U-shaped edge insulation also prevents the primary insulation coating along the longitudinal edges of the bus bars from coming in touch with and sticking to the bus duct housing. A flat sheet of non self-adhering insulation is also provided between the outer stacked bus bars and the housing to provide for sliding movement between the housing and the insulated bus bars.

A section of bus duct comprising an elongated housing having a plurality of flat bus bars disposed longitudinally within the housing with each bus bar having a pair of opposite wide faces and a pair of opposite narrow faces is provided. The bus bars are supported in the housing in a generally stacked relationship with the wide faces of the bus bars being disposed in a face-to-face relationship. The bus duct section is constructed with a connecting portion formed at each end thereof, for connection other bus duct sections. A compact region is formed intermediate the connecting end portions with the bus bars being sandwished in a face-to-face relationship. A primary insulation is provided on each bus bar in the compact region. A U-shaped secondary insulation is disposed around the pair of opposite narrow faces of each of the bus bars in the compact region and a sheet of secondary insulation is disposed between the wide faces of each of the sandwiched bus in the compact region. The U-shaped secondary insulation and the flat sheet of secondary insulation are of a non self-adhering variety so that the bus bars can move due to expansion and contraction with respect to each other without damaging the primary insulation. Materials which have been found to be satisfactory for the secondary insulation are polyester films such as Mylar.

It is an object of this invention to provide a bus duct section having insulated bus bars in close contact which are not subject to failure of insulation due to expansion and contraction of bus bars.

It is another object of this invention to provide a bus duct having coated insulating bus bars wherein a U-shaped insulating member is provided around the edge of the insulated bus bars to prevent sticking to the bus duct housing.

DESCRIPTION OF THE PREFERRED EMBODIMENT

Figure 1:
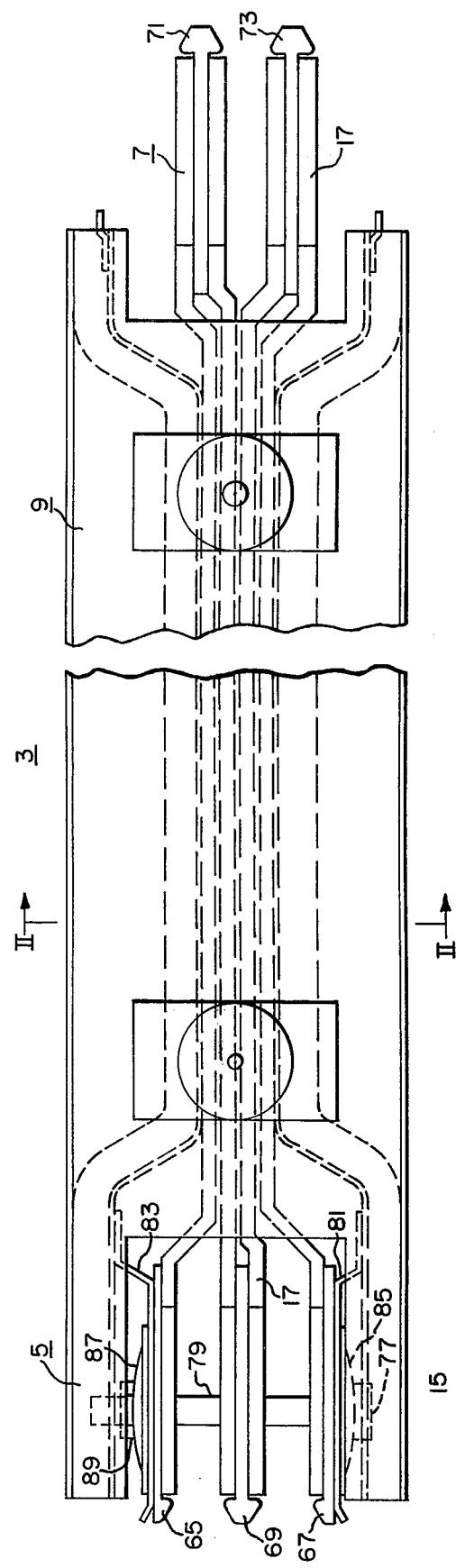
FIG. 1 is a side view of a section of bus duct which can utilize the teaching of the present invention.

Referring now to the drawings and FIG. 1 in particular there is shown an elongated section 3 of bus duct comprising a first connecting end part 5 at one end thereof, a second connecting end part 7 at the other end thereof and a compact region 9 intermediate the connecting ends 5 and 7. Compact region 9 is disposed along the length of the section 3. Although this invention is shown and described for use on a section of bus duct 3 having a single compact region 9 it is to be understood that the number of compact regions can be changed without digressing from the spirit of this invention. The teaching of this invention can be used on a section of bus duct having multiple compact regions 9 as shown in U.S. Pat. No. 3,683,313 by Charles L. Weimer and assigned to the same assignee as the present application.

The bus duct section 3 is an elongated unitary section comprising an elongated unitary housing 15 and a set of four elongated unitary insulated bus bars 17 supported in the housing 15. The bus bars 17 are sandwiched together in compact relationship at the compact region 9, and they are offset at each of the connecting ends 5 and 7 to facilitate connection to other bus duct sections 3. Each of the bus bars 17 comprises a conducting bar 19 formed from an electrical conductor such as aluminum or copper and an insulating coating 21 applied over the conducting bus bar 19. The insulated coating which provides the primary insulation level can be an insulating material such as polyvinyl chloride or the like applied by a dipped fluidized bed process. The insulated bus bars 17 are stacked in a compact relationship with the wide surfaces adjacent to each other. The edges of the insulated bus bars 17 are covered with a secondary non self-adhering U-shaped insulating piece 20. The U-shaped insulation 20 fits over the longitudinal edge of the insulated bus bar 17 and the legs of the U-shaped piece 20 extend inward along the wide face of insulated bus bar 17. During operation the U-shaped insulation which can be formed from polyester, Mylar or the like will adhere to the primary insulation 21 on the bus bar 19. Between each bus bar 19 is then placed a flat sheet 23 of non self-adhering insulation which slides on the U-shaped insulation as the bus bars expand and contract. A flat sheet 23 of non self-adhering insulation is also provided on the top and bottom of the bus bar stack to prevent adhesion to the bus duct housing 15. The primary insulation coating 21 applied to the bus bars 19 is of a high quality but has the disadvantage of being self-adherent under normal operating temperatures and pressures and this could cause a problem if the additional non self-adhering insulating parts 20 and 23 were not provided. The flat insulating sheets 23 and the U-shaped insulating parts 20 which do not adhere to each other under normal operating conditions permits the insulated bus bars 17 to slide, with respect to each other, due to differentials in expansion and contraction. The relative sliding action of the bus bars 17 prevents rupture of the primary insulation 19 which could stick to itself under normal operating conditions. The U-shaped insulation 20 will adhere to the primary insulation 19 of the bus bars 17. The flat sheets of insulation 23 between the bus bars 17 provide the sliding action as the flat sheet insulation 23 slides on the legs of the U-shaped insulation 20. The U-shaped insulation 20 also protects the edges of the insulated bus bars 17 and prevents the primary insulation coating 21 along the edge of the bus bars 17 from coating in contact with and sticking to the bus duct housing 15.

Figure 2:
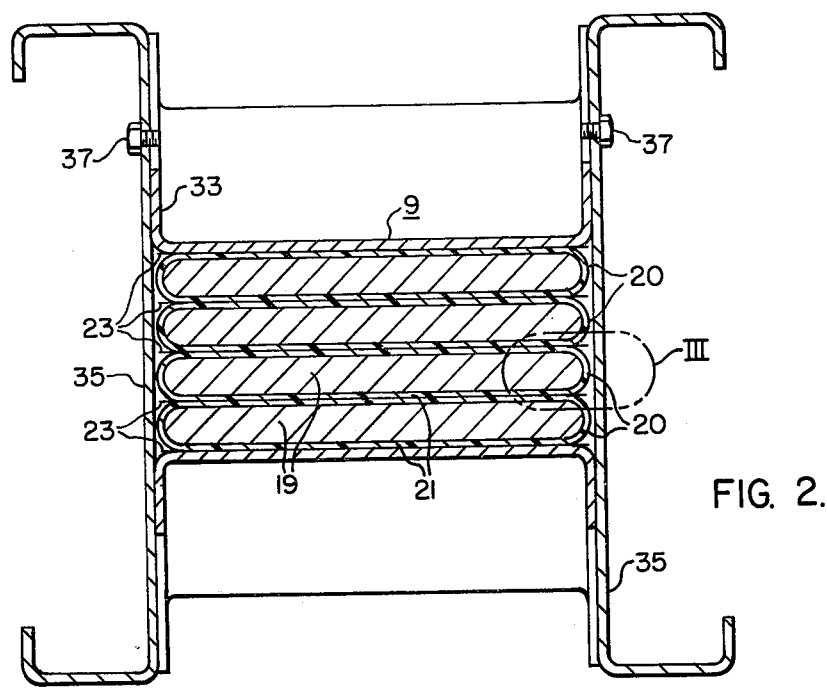
FIG. 2 is a sectional view of the bus duct shown in FIG. 1 along the lines II—II.
Figure 3:
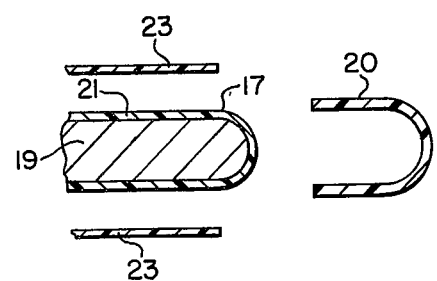
FIG. 3 is an exploded view of a portion of FIG. 2.

The bus duct housing 15 comprises a first pair of opposite housing members 33 and a second pair of opposite housing members 35 which cooperate to provide an elongated tubular housing structure. As can thus be seen in FIG. 2, each of the housing members 33 is generally U-shaped in cross section. As can be seen in FIG. 1, the bus bars 17 are formed to provide a compact region between the end portions 5 and 7. The housing members 35 are generally C-shaped with the free ends of the legs thereof bent over towards each other. The housing members 33 and 35 are normally rigid metallic members formed of steel, aluminum or the like to provide structural strength. During assembly of the bus duct the bottom member of the housing members 33 is welded or otherwise secured to the two housing members 35. Thereafter the U-shaped insulating members 20 are assembled to the insulated bus bars 17 and the bus bars 17 with the U-shaped members 20 attached are assembled into position on the three housing parts with a flat sheet of insulating material 23 between the bus bars and on the top and bottom of the bus bar stack. Thereafter the top or uppermost housing members 33 is pressed down into the position shown in FIG. 2 sandwiching the bus bars 17 between the housing members 33 at the compact regions 9 in a compact sandwiched relationship. A plurality of fasteners 37 are secured to the uppermost housing member 33 and the housing members 35 to secure the housing and bus bar assembly together.

As can be understood with reference to FIG. 1 the bus bars 17 are offset at the connecting end portion 5 and also at the connecting end portion 7. Each of the bus bars 17 is provided with a slot at each of the two opposite ends thereof. At the connecting end parts 5 an insulating spacing member 65 is provided at the outside of the uppermost bus bar and an insulating spacing member 67 is provided at the outside of the lowermost bus bar. An insulating spacing member 69 is provided in between the two center bus bars. At the connecting end part 7 an insulating spacing member 71 is provided between the two uppermost bus bars and an insulating spacing member 73 is provided between the two lowermost bus bars. All of the insulating spacing members at the connecting end parts 5 and 7 are rigid molded insulating spacing members. The insulating spacing members 71, 73 have slots formed therein to align with the slots in the bus bars 17 at the connecting end part 7. The insulating spacing members 65, 67, 69 have openings formed therein aligned with the slots in the bus bars 17 at the connecting end part 5. An elongated bolt 77 having an insulating tube 79 thereon is passed through the openings in the insulating members 65, 67 and 69 and through the slots in the bus bars 17 at the connecting end part 5. Bolt 77 also passes through openings in metal plates 81 and 83 that are secured to the housing 15 at the connecting end part 5. A pair of spring washers 85, 87 are provided on the outside of the members 81, 83 and a nut 89 is threaded onto the bolt 77. When similar sections of bus duct are to be connected in an end-to-end relationship, at least one of the sections is moved longitudinally relative to the other section to move the bus bars of the section into an overlapping relationship. The slots of the bus bars 17 and insulating members 71, 73 of one section receive the bolt 77 and insulating tube 79 that are supported on the connecting end part 5 of the other section. The side portions at a joint can be closed and covered by means of a joint cover. The portions of the bus bars 17 which come in contact when a joint is made are free of insulation. When the sections are positioned nut 89 is tightened applying pressure to the opposite spring washers 85 and 87 to draw the uninsulated portions of the bus bars 19 and the insulating members into a tight compact relationship to physically and electrically connect the bus bars of the two sections. The spring washers 85 and 87 provide a biasing support to provide good contact pressure between the connecting bus bars.

I claim:
1. A section of bus duct comprising:
an elongated housing;
a plurality of flat bus bars disposed longitudinally within said housing, each comprising a pair of opposite wide faces and a pair of opposite narrow faces;
said bus bars being supported in said housing in a generally stacked sandwiched relationship with the wide faces thereof being in a face-to-face relationship;
a first connecting end portion formed at one end of the bus duct section;
a second connecting end portion formed at the other end of the bus duct section, said bus bars at each end of said first connecting end portion and said second connecting end portion being spaced to receive additional bus bars and insulating means in a lapped type connection;

a compact region formed intermediate said first connecting end portion and said second connecting end portion with said bus bars being sandwiched in a face-to-face relationship;

a primary insulation provided on each bus bar in said compact region;

a U-shaped secondary insulation disposed around the pair of opposite narrow faces of each of said bus bars in said compact region;

a sheet of secondary insulation disposed between the wide faces of each of said sandwiched bus bars in said compact regions; and said U-shaped secondary insulation and said sheet of secondary insulation being of a non self-adhering variety so that said bus bars can slide with respect to each other without damaging the primary insulation.

2. A section of bus duct as claimed in claim 1 wherein:

said primary insulation comprises polyvinyl chloride; and said U-shaped secondary insulation and said sheet of secondary insulation comprises polyester.

3. A section of bus duct as claimed in claim 1 comprising a second set of sheets of secondary insulation disposed between the wide faces of the outside sandwiched bus bars and said elongated housing.

4. Electric power distribution apparatus comprising:

an elongated metal housing;

a plurality of flat bus bars disposed longitudinally within said housing with at least a portion thereof sandwiched together by said housing in a face-to-face relationship;

a primary layer of a first insulating material coating each of said bus bars where they are sandwiched together;

a flat sheet of a second insulating material disposed between each of said bus bars where they are sandwiched together having approximately the same width as the associated bus bars;

U-shaped insulating means surrounding the longitudinally extending edges of each of said bus bars where they are sandwiched together and being of a material which is non-adhering to said flat sheet of a second insulating material so that some relative movement of said bus bars can occur without damaging said primary layer of a first insulating material; and, the legs of the U-shaped insulating means extending past the portion of said flat sheet disposed in proximity to the edge of the bus bars so the insulation thickness separating adjacent bus bars is relatively greater near the edges of the bus bars.

5. Electric power distribution apparatus as claimed in claim 4 wherein said flat sheet comprises polyester and said U-shaped insulating means comprises polyester.

6. Electric conductor apparatus with an elongated housing supporting a plurality of flat insulated bus bars in a sandwiched relationship comprising:

a U-shaped electric insulating material surrounding the longitudinally extending edges of the flat insulated bus bars; and a flat insulating sheet formed of a material which does not adhere to said U-shaped electric insulating material disposed between the bus bars.

7. Electric conductor apparatus as claimed in claim 6 including flat insulating sheets formed of a material which does not adhere to the elongated housing disposed between the bus bars and the elongated housing.

8. Electric conductor apparatus as claimed in claim 7 wherein said U-shaped electric insulating material, said flat insulating sheet disposed between the bus bars, and said flat sheets disposed between the bus bars and the elongated housing are formed from a non self-adhering material.

9. Electric conductor apparatus as claimed in claim 8 wherein the non self-adhering material comprises polyester.

* * * * *